United States Patent [19]
Forrest

[11] Patent Number: 5,951,426
[45] Date of Patent: Sep. 14, 1999

[54] HYDRAULICALLY TRIGGERED LIMITED SLIP DIFFERENTIAL

[75] Inventor: James L. Forrest, Ashley, Ind.

[73] Assignee: Auburn Gear, Inc., Auburn, Ind.

[21] Appl. No.: 09/030,603

[22] Filed: Feb. 25, 1998

[51] Int. Cl.$^6$ .................................................. F16H 48/06
[52] U.S. Cl. .......................... 475/88; 475/230; 475/236; 475/231
[58] Field of Search ................................... 475/231, 230, 475/234, 235, 236, 88, 86

[56] References Cited

U.S. PATENT DOCUMENTS

| | | |
|---|---|---|
| 1,487,073 | 3/1924 | Nogrady . |
| 2,855,805 | 10/1958 | Fallon . |
| 3,229,550 | 1/1966 | Nickell . |
| 3,350,961 | 11/1967 | Doge . |
| 3,361,008 | 1/1968 | Fallon . |
| 3,390,593 | 7/1968 | Brownyer . |
| 3,546,969 | 12/1970 | Gibson et al. . |
| 3,724,289 | 4/1973 | Kennicutt . |
| 3,742,784 | 7/1973 | Engle . |
| 3,815,443 | 6/1974 | McAninch et al. . |
| 3,894,446 | 7/1975 | Snoy et al. . |
| 3,987,689 | 10/1976 | Engle . |
| 3,994,375 | 11/1976 | Stritzel .................................. 475/86 X |
| 4,012,968 | 3/1977 | Kelbel . |
| 4,059,026 | 11/1977 | Stritzel . |
| 4,263,824 | 4/1981 | Mueller . |
| 4,269,086 | 5/1981 | Altmann . |
| 4,389,909 | 6/1983 | Goscenski, Jr. . |
| 4,445,400 | 5/1984 | Sullivan et al. . |
| 4,601,359 | 7/1986 | Weismann et al. . |
| 4,612,825 | 9/1986 | Engle . |
| 4,679,463 | 7/1987 | Ozaki et al. . |
| 4,727,966 | 3/1988 | Hiramatsu et al. . |
| 4,730,514 | 3/1988 | Shikata et al. . |
| 4,732,052 | 3/1988 | Dewald . |
| 4,876,921 | 10/1989 | Yasui et al. . |
| 4,884,470 | 12/1989 | Onoue . |

(List continued on next page.)

OTHER PUBLICATIONS

"VISCO–LOK: A Speed Sensing Limited–Slip Device with High–Torque Progressive Engagement", SAE Technical Paper Series, No. 960718, Feb. 1996.
"Eaton Electronically Controlled Limited Slip", Eaton Corporation.
"LSD's Limited Slip Differentials", Tochigi Fuji Sangyo Kabushiki Kaisha.
"VISCO LOK Benefits/Highlights", GKN Viscodrive GmbH.
"Tech & Trends Gerodisc Slashes Cost, Weight in All–Wheel Drive", Aug. 1992.
"DISCO–TECH", Automotive Industries, Jun. 1992.
"Development of the Electro–Magnetic Controlled Limited Slip Differentiall Unit (EMCD)", Tochigi Fuji Sangyo K.K.
"Eaton Automatic Locker", Eaton Corporation.

*Primary Examiner*—Dirk Wright
*Assistant Examiner*—Peter T. Kwon
*Attorney, Agent, or Firm*—Baker & Daniels

[57] ABSTRACT

A hydraulically actuated limited slip differential which transfers a predetermined amount of clutch torque each time the clutch mechanism is triggered. The differential includes a hydraulic pump mechanism comprising a plurality of fluid supply passages disposed in a side gear and in fluid communication with a cavity defined by the side gear and the clutch mechanism. The hydraulic pump mechanism transfers fluid into the cavity in response to meshing rotation between the pinion gears and the side gears. Sufficiently high differentiation between the output shafts increases the pressure in the cavity to trigger the frictional clutch mechanism with the differential casing to provide braking action between the side gears and the differential casing. The clutch mechanism includes a cone clutch element having a frusto-conical engagement surface which frictionally engages an insert having a complementary frusto-conical engagement surface. The hydraulic trigger and cam separation produce a predetermined amount of axial movement by the cone clutch element and the insert to provide a predetermined amount of clutch torque.

20 Claims, 4 Drawing Sheets

U.S. PATENT DOCUMENTS

| | | |
|---|---|---|
| 4,957,473 | 9/1990 | Takemura et al. . |
| 4,976,667 | 12/1990 | Goscenski, Jr. .................... 475/234 X |
| 5,019,021 | 5/1991 | Janson . |
| 5,037,362 | 8/1991 | Teraoka et al. . |
| 5,045,038 | 9/1991 | Sherlock . |
| 5,059,160 | 10/1991 | Raniero . |
| 5,087,228 | 2/1992 | Johansson . |
| 5,092,825 | 3/1992 | Goscenscki, Jr. et al. . |
| 5,226,861 | 7/1993 | Engle . |
| 5,232,410 | 8/1993 | Yanai ................. 475/231 X |
| 5,310,388 | 5/1994 | Okcuoglu et al. . |
| 5,520,589 | 5/1996 | Dewald et al. ......... 475/231 |
| 5,536,215 | 7/1996 | Shaffer et al. . |
| 5,556,344 | 9/1996 | Fox . |
| 5,591,098 | 1/1997 | Jones et al. ............ 475/231 |
| 5,709,627 | 1/1998 | Teraoka ................ 475/88 X |
| 5,741,199 | 4/1998 | Tanser et al. . |

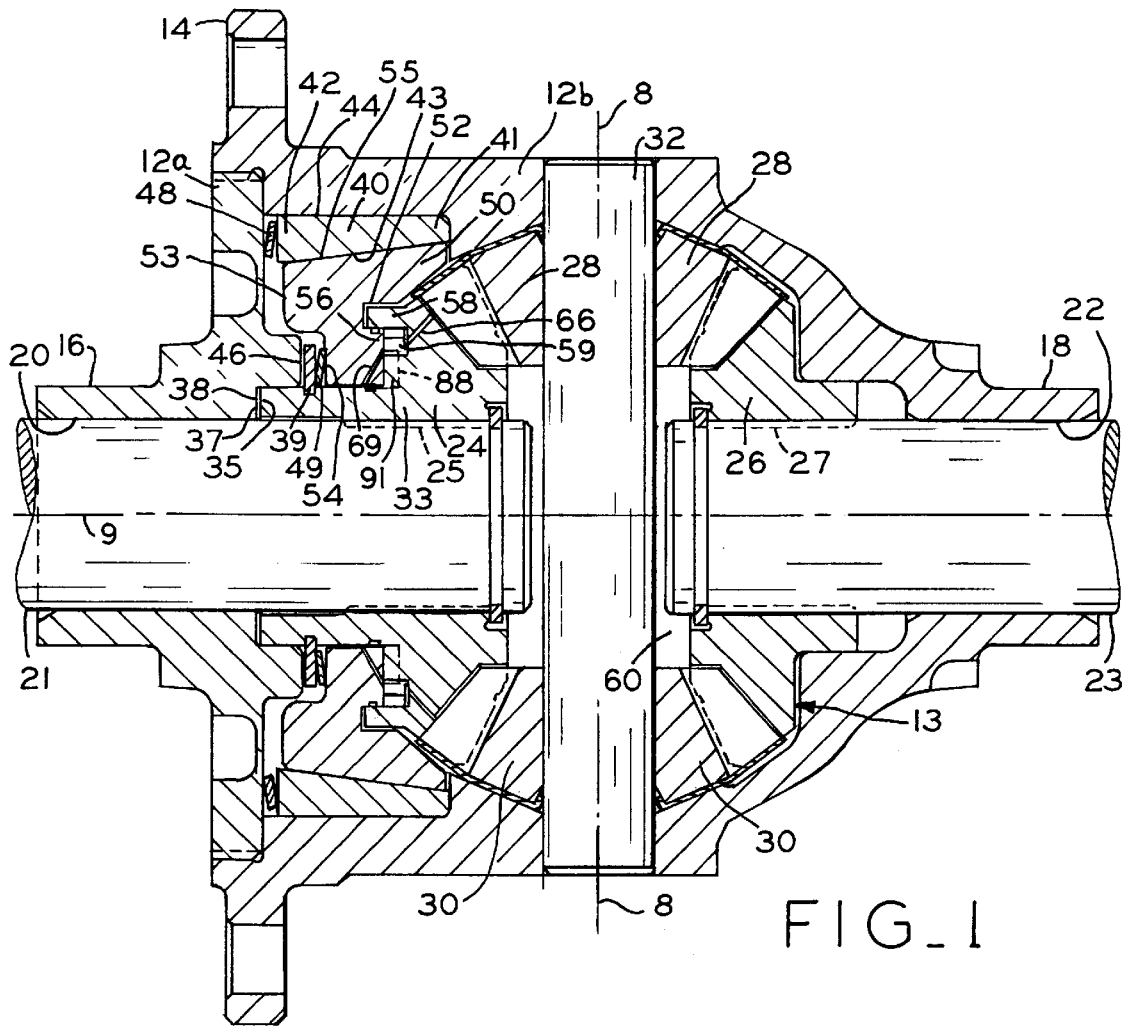
FIG_1
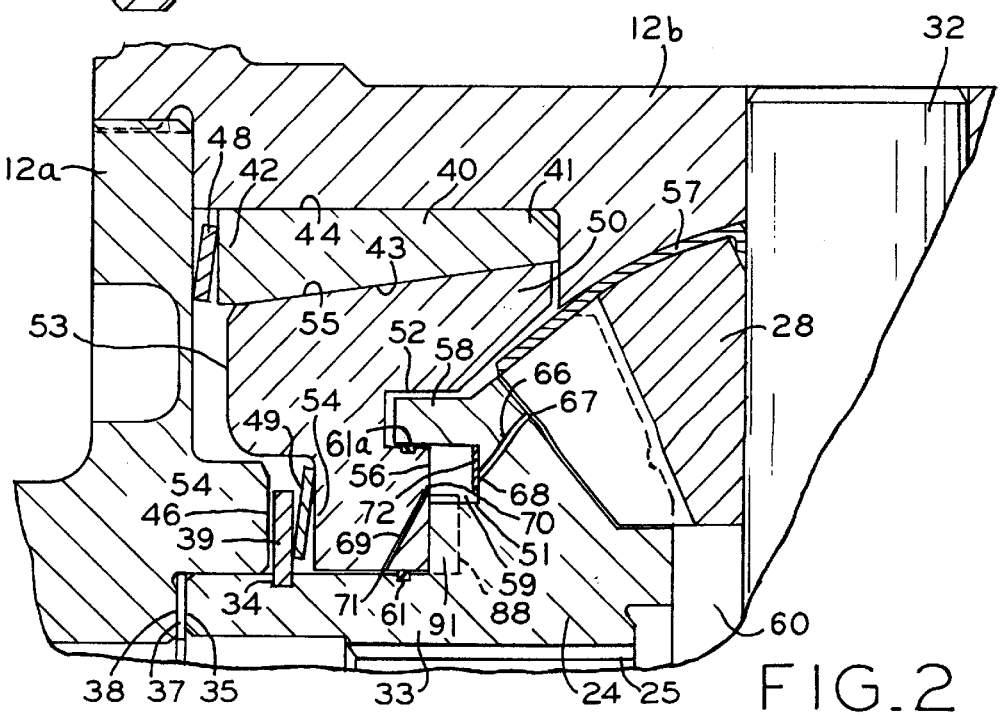
FIG_2

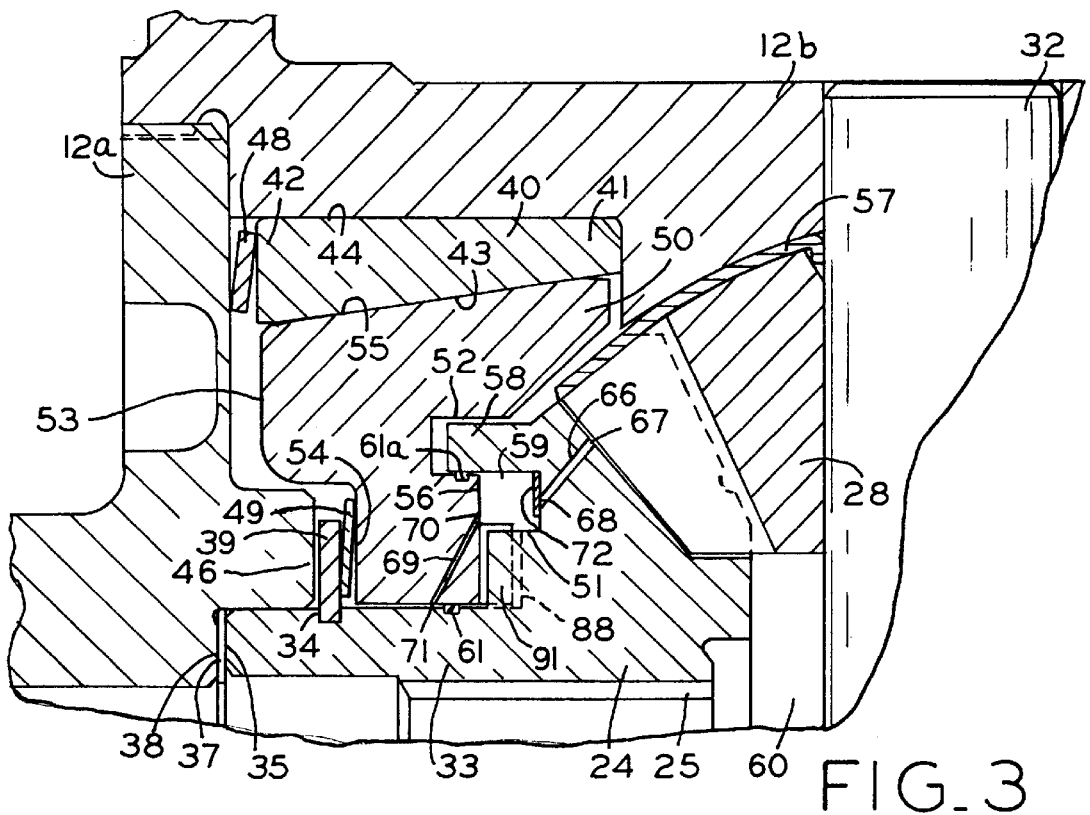
FIG_3
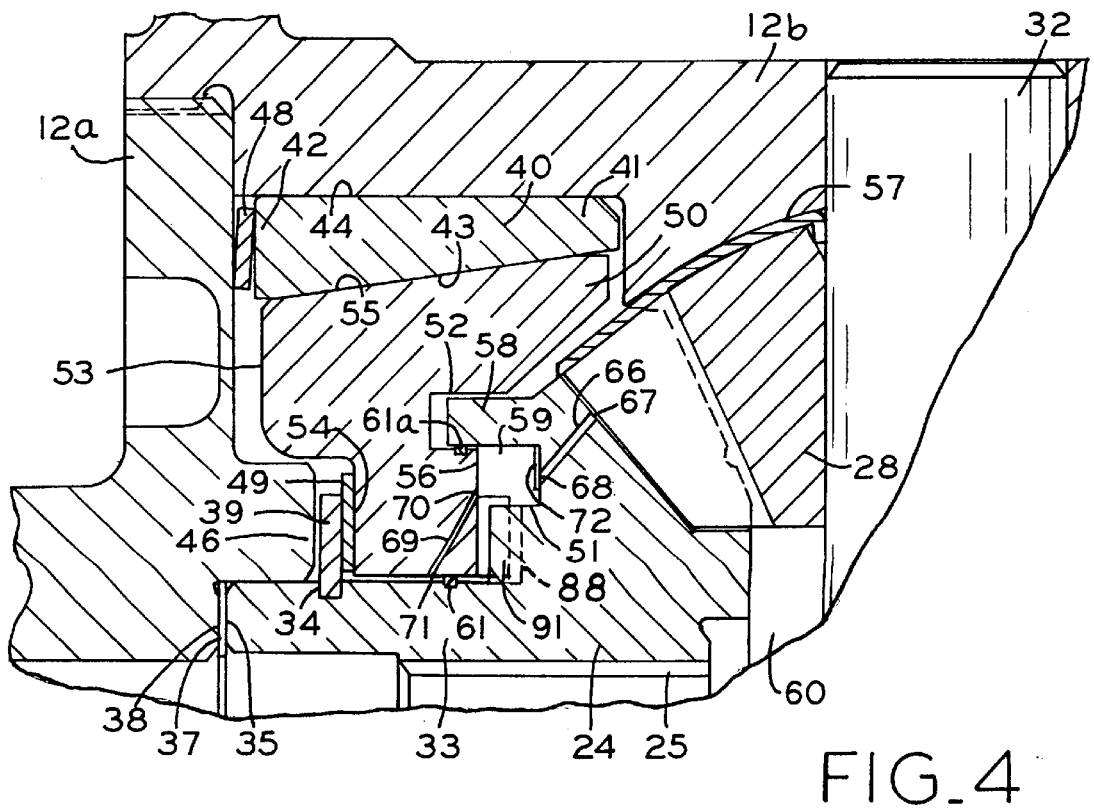
FIG_4

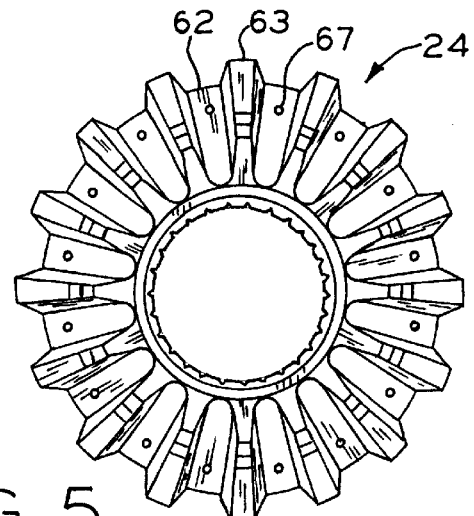
FIG_5
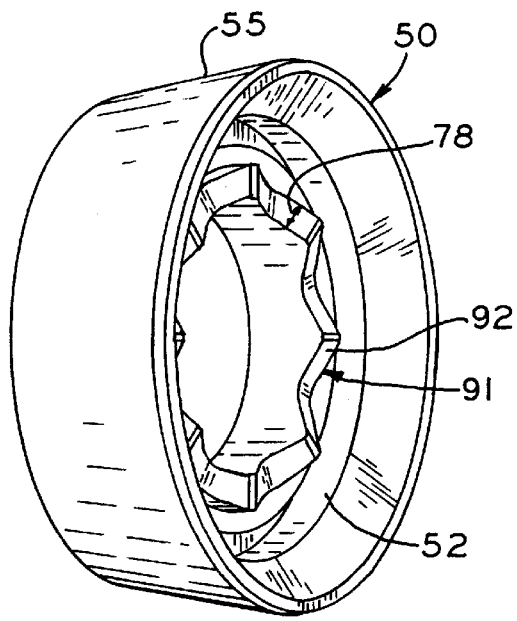
FIG_6
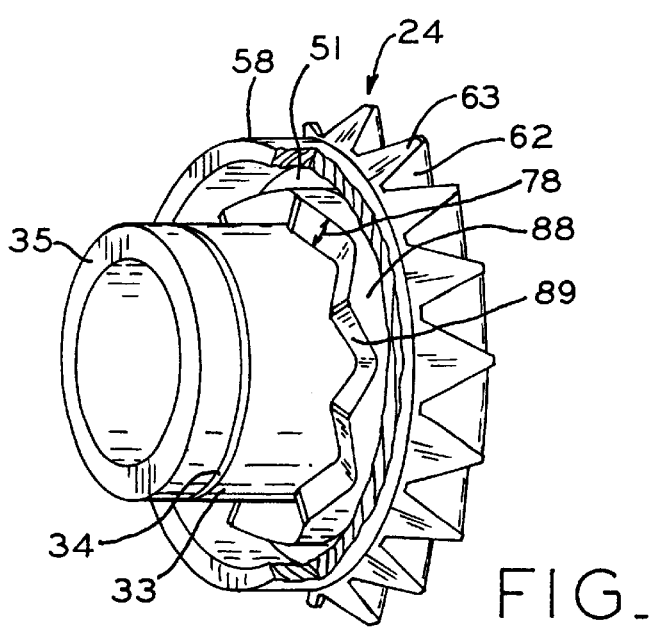
FIG_7

HYDRAULICALLY TRIGGERED LIMITED SLIP DIFFERENTIAL

BACKGROUND OF THE INVENTION

1. Field of the Invention.

The present invention relates to differentials, and more particularly, to limited slip differentials.

2. Description of the Related Art.

Differentials are well known in the prior art and allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, the necessity for a differential which limits the differential rotation between the output shafts to provide traction on slippery surfaces is well known.

The completely open differential, i.e. a differential without clutches or springs, is unsuitable in slippery conditions where one wheel experiences a much lower coefficient of friction than the other wheel, for instance, when one wheel of a vehicle is located on a patch of ice and the other wheel is on dry pavement. In such a condition, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior methods of limiting slippage between the side gears and the differential casing use a frictional clutch mechanism, either clutch plates or a frusto-conical structure, and a bias mechanism, usually a spring, to apply an initial preload between the side gears and the differential casing. By using a frictional clutch with an initial preload, provided, for example, by a spring, a minimum amount of torque can always be applied to the wheel having traction, i.e. the wheel located on dry pavement. The initial torque generates gear separating forces which further engage the frictional clutch and develop additional torque. Examples of such limited slip differentials are disclosed in U.S. Pat. Nos. 4,612,825 (Engle), 5,226,861 (Engle) and 5,556,344 (Fox), which are assigned to the assignee of the present invention and are expressly incorporated herein by reference.

The initial preload initiates the development of side gear separating forces which provide further braking action between the side gears and the differential casing. In general, gear separating forces are forces induced on any set of meshing gears by the application of torque to the gears and which forces tend to separate the gears. In a differential, the development of torque will create side gear separating forces which tend to move the side gears away from the pinion gears. When one wheel is on surface having a low coefficient of friction, the initial preload creates some contact and frictional engagement between the differential casing and the clutch mechanism disposed between the side gears and the differential casing to allow the engine to provide torque to the wheel having traction. This initial torque transfer induces gear separating forces on the side gears which tend to separate the side gears to further frictionally engage the clutch mechanism with the casing. The increased frictional engagement of the clutch allows more torque to be developed, thus further increasing the side gear separating forces and limiting the slippage between the side gears and the differential casing.

However, such preloaded clutches are usually always engaged, and thus are susceptible to wear, causing undesirable repair and replacement costs. Additionally, such clutch mechanisms usually employ spring mechanisms which add to the cost and difficulty of manufacture.

Additionally, such a preloaded clutch mechanism may lock the output shafts together in situations where differential rotation is necessary. For example, if the vehicle is making a turn when the wheels are sufficiently engaged on the road surface and a sufficient amount of torque is developed, the differential will tend to lock up the output shafts due to the action of the side gear separating forces created by the developed torque.

Another method of limiting slippage involves engaging a frictional clutch mechanism between the side gears and the differential casing based on the difference in rotational speeds between the two output shafts. The frictional clutch may be actuated by various hydraulic pump mechanism which may be external to the differential case or may be constructed of elements disposed inside the differential casing.

A prior art method of limiting slippage involves using a flyweight governor in combination with a clutch mechanism wherein the governor actuates the clutch mechanism when a predetermined differential rotation rate is detected. However, prior art devices using such arrangements are configured such that the governor almost instantaneously applies extremely high clutch torque to the output shafts, essentially locking the two output shafts together. Applying locking torque in such a manner applies very high stresses on the output shafts and may result in fracturing the output shafts.

Thus, what is needed is a simple, durable and reliable limited. slip differential which can effectively provide torque to the wheel with traction.

What is also needed is a limited slip differential which is responsive to speed difference to provide the limited slip function only when required, i.e. limited slip when one wheel has lost traction, but relatively open when sufficient torque is developed.

What is also needed is a limited slip differential which applies a predetermined amount of clutch torque in response to a loss of traction.

Lastly, what is also needed is a limited slip differential which applies only a predetermined amount of clutch torque during a loss of traction.

SUMMARY OF THE INVENTION

The limited slip differential according to the present invention comprises a hydraulically actuated clutch mechanism which transfers a predetermined amount of clutch torque to an output element. The clutch mechanism is actuated by a fluid pump assembly which is disposed inside the differential casing and provides an output that depends on the rate of differential rotation between the output elements. The clutch mechanism is disposed between the side gear and the differential casing and includes a one clutch element disposed adjacent the side gear and an insert disposed between the cone clutch element and the differential casing. The cone clutch element is adapted to rotate about the axis of the side gear and also to move along the axis of the side gear. the insert is secured to the differential casing such that the insert cannot rotate with respect to the differential casing, but can move along the axis of the side gear.

The cone clutch element includes a frusto-conical engagement surface which frictionally engages a complementary frusto-conical engagement surface disposed on the insert. When the limited slip feature is not required, the frusto-conical engagement surfaces are disengaged and the present differential is an open differential. When the limited slip feature is required, the hydraulic pump assembly triggers an initial movement between the cone clutch element and the side gear. The initial movement engages the frusto-conical engagement surfaces to thereby transfer an initial amount of frictional clutch torque to the side gear.

The cone clutch element also includes a cam portion having ramp surfaces and which engages a corresponding cam portion and ramp surfaces disposed on the side gear. When the present limited slip differential operates as an open differential, the cam portions on the cone clutch element and side gear are fittingly engaged and the cone clutch element rotates at the same speed as the side gear. When the limited slip feature is triggered, the initial engagement of the frusto-conical engagement surfaces causes an interaction between the cam portions which produces a predetermined amount of axial movement between the cone clutch element and the side gear. The axial movement of the cone clutch element also results in a corresponding axial movement of the insert. The predetermined axial movement transfers a predetermined amount of frictional clutch torque to the side gear.

The amount of clutch torque transferred is selected by varying the angle of the frusto-conical engagement surfaces on the cone clutch element and the insert, and a spring located between the insert and the differential casing. The movement of the cone clutch element is purposely limited such that the spring does riot become solidly depressed.

The fluid pump assembly according to the present invention is a simple, rugged and durable design. The fluid pump assembly includes a plurality of supply passages disposed in a side gear, each supply passage having an inlet disposed on the root surface of a side gear and an outlet in fluid communication with a cavity formed by the side gear and the clutch mechanism. With such a configuration, the fluid pump assembly provides fluid pressure to transfer the fluid located within the root volumes of the side gear into the cavity when meshing rotation exists between the respective roots and teeth of the pinion gears and the side gears. When such meshing rotation exists, a tooth of the pinion gear rotates to mesh with a root of the side gear to displace the volume of fluid held in the root volume to force that volume of fluid into the supply passage. The output of the pump assembly depends on the rate of meshing relative rotation between the pinion and side gears. The pumping action builds up the fluid pressure in the cavity which in turn actuates the clutch mechanism.

BRIEF DESCRIPTION OF THE DRAWINGS

The above mentioned and other features and objects of this invention, and the manner of attaining them, will become more apparent and the invention itself will be better understood by reference to the following description of the embodiment of the invention taken in conjunction with the accompanying drawings, wherein:

FIG. 1 is a sectional view of an embodiment of a limited slip differential of the present invention;

FIG. 2 is an enlarged fragmentary sectional view of FIG. 1 showing a limited slip differential of the present invention in the disengaged phase;

FIG. 3 is an enlarged fragmentary sectional view of FIG. 1 showing a limited slip differential of the present invention in the transition phase;

FIG. 4 is an enlarged fragmentary sectional view of FIG. 1 showing a limited slip differential of the present invention in the engaged phase;

FIG. 5 is a front elevational view of the side gear showing the supply passage inlets disposed on the surface of the side gear;

FIG. 6 is a perspective view of the cone clutch element showing the cam portion and the ramp surfaces;

FIG. 7 is a perspective view of the side gear showing the cam portion and the ramp surfaces;

Figure 8:
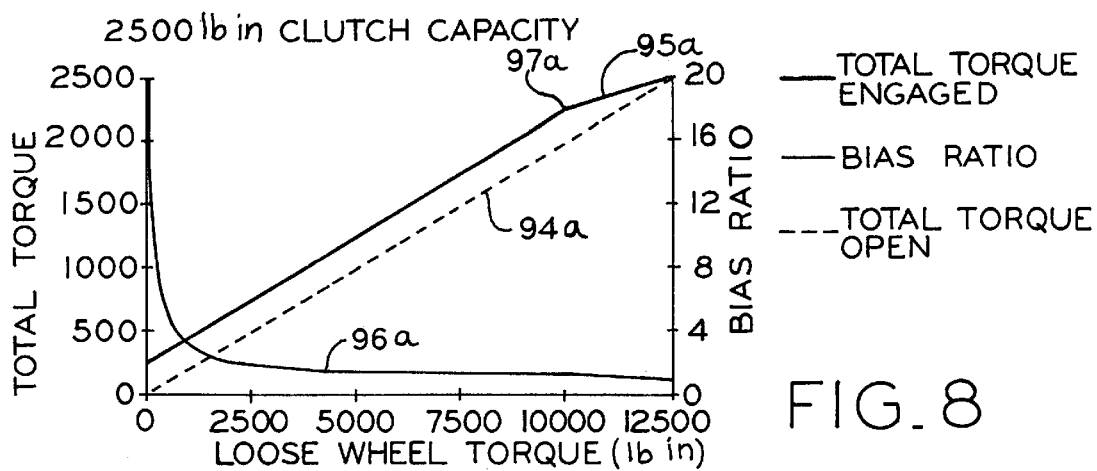
FIG. 8 is a chart illustrating the performance characteristics for a differential of the present invention with a 2500 lb. in clutch capacity.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, and such exemplification is not to be construed as limiting the scope of the invention in any manner.

DETAILED DESCRIPTION OF THE INVENTION

The embodiment disclosed below is not intended to be exhaustive or limit the invention to the precise form disclosed in the following detailed description. Rather, the disclosed embodiment is chosen and described so that others skilled in the art may be able to utilize its teachings.

Referring to the drawings, and particularly to FIG. 1–4, limited slip differential 10 of the present invention comprises differential casing 12 which is constructed by joining casing sections 12a and 12b to form a generally cylindrical structure having inner cavity 13. Inner cavity 13 is constructed to hold a differential gear assembly and includes end walls formed on the interior surfaces of casing sections 12a, 12b. The exterior surface of casing 12 includes flange 14 formed on one side thereof for connecting differential 10 to a driving ring gear (not shown) using conventionally known means, such as threaded fasteners (not shown). Casing 12 also includes hollow receiving hubs 16, 18 on each end, the hubs defining apertures 20, 22 for accepting output shafts 21, 23.

Disposed within inner cavity 13 are meshingly engaged pinion gears 28, 30 and side gears 24, 26. Pinion gears 28, 30 are disposed at right angles to side gears 24, 26 and are rotatably mounted on cross pin 32. Cross pin 32 is fixedly disposed in inner cavity 13, generally near the middle of inner cavity 13. Cross pin 32 is locked in position within casing 12 such that pinion gears 28, 30 rotate with casing 12 around axis 9 defined by hubs 16, 18. Pinion gears 28, 30 can also rotate around the axis of cross pin 32.

Side gears 24, 26 are axially aligned and rotatably disposed within casing 12 to rotate about horizontal axis 9. Side gears 24, 26 include internal splines 25, 27 which engage corresponding splines of output shafts 21, 23. The roots and teeth of side gears 24, 26 meshingly engage the roots and teeth of pinion gears of 28, 30 such that differential rotation can be effected between casing 12 and output shafts 21, 23. Further, cavity 60 is formed between side gears 24, 26.

On the side opposite the gear teeth and roots, side gear 24 includes flange 58 which fittingly engages recessed portion 52 of cone clutch element 50. Side gear 24 includes recessed portion 51 formed adjacent and inward of flange 58. Recessed portion 51 in conjunction with surface 56 of cone clutch element 50 forms cavity 59. Cam portion 88 is disposed around side gear 24 adjacent and inward of recessed portion 51. As shown in FIG. 7, cam portion 88 includes undulating ramp surfaces 89 formed around side gear 24. Further inward of cam portion 88 is elongate portion 33 which is surrounded by cone clutch element 50 and includes end portion 35 in operative contact with casing surface 38 via thrust washer 37. Snap ring 39 is disposed in groove 34 of elongate portion 33 and serves to couple side gear 24 and cone clutch element 50 as described further below.

As further shown in FIGS. 1–4, the present limited slip differential includes a clutch mechanism comprising cone clutch element 50 and insert 40. Cone clutch element 50 is generally T-shaped in cross section and is disposed between side gear 24 and insert 40. Cone clutch element 50 includes frusto-conical engagement surface 55 which frictionally engages a complementary frusto-conical engagement surface 43 disposed on insert 40 to provide clutch torque when a fluid pump assembly triggers the clutch mechanism. Cone clutch element 50 includes recessed portion 52 which fittingly engages flange 58 of side gear 24. Inward of recessed portion 52 is planar surface 56 which in combination with recessed portion 51 forms cavity 59. Further inward of surface 56 is cam portion 91. As shown in FIG. 6, cam portion 91 includes undulating ramp surfaces 92 formed around the axis of cone clutch element 50. Cam portion 91 fittingly engages cam portion 88 of side gear 24.

Belleville spring 49 is disposed between cone clutch element surface 54 and snap ring 39 to initially urge cone clutch element 50 to the right in FIG. 2 to force cam portions 88 and 91 into tight fitting engagement. When differential 10 operates as an open differential, the bias provided by Belleville spring 49 just holds frusto-conical engagement surface 55 from engagement with frusto-conical engagement surface 43.

Bleed-off passages 69 which form a part of the fluid pump assembly are also disposed in cone clutch element 50. Bleed-off passages 69 includes passage inlets 70 in fluid communication with cavity 59 and passage outlets 71 disposed on a surface of cone clutch element 50 adjacent elongate portion 33. Bleed-off passages 69 provide a fluid path to relieve the pressure in cavity 59. Surrounding seal 61 is disposed between the sidewalls of cone clutch element 50 and side gear 24 to prevent fluid leakage from cavity 59 through the sidewalls of cone clutch element 50 and side gear 24. Seal 61a is located between planar surface 56 and flange 58.

As further shown in FIGS. 1–4, insert 40 is disposed between cone clutch element 50 and casing section 12b. Insert 40 is secured against casing section 12b such that insert 40 cannot rotate radially with respect to casing 12, but can move axially with respect to casing section 12b. Frusto-conical surfaces 43 and 55 become frictionally engaged when cone clutch element 50 initially moves axially toward casing section 12a, i.e. moves to the left in FIG. 2. The initial frictional engagement transfers an initial amount of clutch torque between casing 12 and side gear 24. Further axial movement of cone clutch element 50 caused by the interaction of cam portions 88 and 91 forces insert 40 to move axially with cone clutch element 50 toward casing section 12a, i.e. to the left. Belleville spring 48 is disposed between insert end portion 42 and casing section 12a to initially urge insert end portion 42 away from casing section 12a and to resist the movement of insert 40 toward casing section 12a. The movement limit of insert 40 and cone clutch element 50 toward casing section 12a is reached, and thus the clutch mechanism is fully engaged, when Belleville spring 48 is collapsed to a predetermined point. The full engagement of the clutch mechanism transfers a predetermined amount of clutch torque between casing 12 and side gear 24. The amount of clutch torque transferred between casing 12 and side gear 24 may be selected by varying the design characteristics of Belleville spring 48 and the configurations of the frusto-conical surfaces and ramp surfaces.

The combination of recessed portion 51 and cone clutch element surface 56 form cavity 59 which is used in conjunction with a fluid pump assembly to actuate the movement of cone clutch element 50 and insert 40. Cavity 59 is in fluid communication with fluid supply passages 66 which are formed on side gear 24 and form a part of a gear pump assembly with side gear 24 and pinion gears 28, 30. Cavity 59 is also in fluid communication with bleed-off passages 69, which are formed on cone clutch element 50. Fluid supply passages 66 provide a fluid source path to increase the fluid pressure in cavity 59, and bleed off passages 69 provide a fluid relief path to decrease the pressure in cavity 59.

It is to be understood that fluid supply passages 66 may be sized to permit a larger fluid flow rate than bleed off passages 69 to allow relatively rapid build up of fluid pressure in cavity 59, but a slower rate of fluid pressure reduction. Reed valve 72 is disposed in cavity 59 adjacent supply passage outlet openings 68 to ensure one-way flow through fluid supply passages 66. The fluid pump assembly for supplying fluid flow through fluid supply passages 66 is further described below.

The fluid pump assembly is formed by the combination of side gear 24, pinion gears 28, 30, and fluid supply passages 66 disposed in side gear 24. In particular, as shown in FIGS. 2–5, side gear 24 includes a plurality of fluid supply passages 66, each fluid supply passage 66 including an inlet opening 67 disposed on the surface of each respective root 62 of side gear 24 and an outlet opening 68 disposed on a surface of cavity 59. Although in FIG. 5 each surface of root 62 includes an inlet opening 67, it is to be understood that the number of inlet openings as well as the ratio of inlet openings to root surfaces may be adjusted as desired and that the size of inlet openings 67 and outlet openings 68 may be adjusted as desired to provide the required fluid flow rates.

The fluid pump assembly provides pressure to transfer fluid trapped in the root volumes of side gear 24 into cavity 59 based on the meshing rotation between side gear 24 and pinion gears 28, 30. As side gear 24 and pinion gears 28, 30 rotate with respect to each other, about axis 9 and 8, respectively, the roots and teeth of the respective gears meshingly engage and disengage with each other. As a root 62 of side gear 24 comes into engagement with a tooth of pinion gears 28 or 30, the pinion gear tooth displaces the volume of fluid trapped in root 62 and forces the fluid into inlet opening 67 disposed in the root surface. The roots and teeth of side gear 24 and pinion gears 28, 30 are angled to mesh closer at the face portion than at the base portion in order to facilitate and direct the movement of the fluid into inlet openings 67 which are disposed near the heel area of side gear 24. Sealing washer 57 is disposed against the heel area of side gear 24 and pinion gear 28 to reduce the loss of fluid through the heel area of side gear 24 and pinion gear 28.

It can be seen that the fluid pump assembly output is speed sensitive since the pump output, and thus the rate of fluid introduction into cavity 59 through fluid supply passages 66 depends on the rate of meshing rotation between side gear 24 and pinion gears 28, 30, i.e., as the speed of meshing rotation increases, the amount of fluid transferred through fluid supply passages 66 increases. Therefore, a high rate of differential rotation between side gear 24 and pinion gears 28, 30, which indicates high differentiation between output shafts 21, 23, and a possible "spin out." condition, results in a rapid rate of fluid introduction into cavity 59 thereby increasing fluid pressure in cavity 59 to trigger the frictional engagement of cone clutch element 50 and insert 40. It can be seen that a relatively slow introduction of fluid into cavity 59 will not result in fluid pressure build-up in cavity 59 since sufficient fluid will be discharged through bleed-off passages 69, but that a rapid introduction of fluid into cavity 59 will build-up fluid pressure in cavity 59. Thus, normal cornering will not be affected by the present differential design as the gear mesh and frequency will not be sufficient to create excessive pressure in cavity 59.

The pressure build-up in cavity 59 provides a separation force between side gear 24 and cone clutch element 50 to move cone clutch element 50 to the left in FIG. 2, namely toward casing section 12a. As a result of this movement, frusto-conical engagement surfaces 43 and 55 frictionally engage. The frictional engagement forces cone clutch element 50 to momentarily slow down with respect to side gear 24. The momentary slow down in turn causes ramp surfaces 89 and 92 to ride up on each other thereby causing further axial movement between cone clutch element 50 and side gear 24 and causing frusto-conical engagement surfaces 43 and 55 to tightly engage and transfer more frictional torque. Further ride up of ramp surfaces 89 and 92 causes cone clutch element 50 and insert 40 to move axially toward casing section 12a until the desired collapse point of Belleville spring 48 is reached. At that point, the clutch mechanism is fully engaged and a predetermined frictional clutch torque is transferred to side gear 24. It is to be noted that cone clutch element 50 and side gear 24 momentarily rotate at different speeds as ramp surfaces 89 and 92 ride up on each other, but rotate at the same speed once the clutch mechanism is engaged. It is also to be noted that once the triggering force is applied, in this case by the fluid pressure mechanism, the clutch mechanism automatically reaches the fully engaged phase.

The relationship between the geometries of ramp surfaces 89, 92 and cone clutch element 50 determines whether the separation force on ramp surfaces 89, 92 will continue to increase and add force to cone clutch element 50 to fully engage the clutch mechanism or will become reduced to zero, adding nothing to cone clutch element 50. For differential 10 to provide the desired performance, the separation force must continually increase so that cone clutch element 50 and side gear 24 may experience the full design range of axial movement. The necessary relationships; between the design elements of cone clutch element 50 and ramp surfaces 89, 92 are now described.

Factors necessary to describe the characteristic of cone clutch element 50 include:

$\mu$=coefficient of friction between the frusto-conical engagement surfaces 43 and 55;

$\alpha$=angle of frusto-conical engagement surface 55; and

Rc=mean radius of frusto-conical engagement surface 55.

In this case, the angle $\alpha$ is measured parallel to the axis of rotation and the mean radius is determined from the axis of rotation, i.e. axis 9.

These elements determine the "Cone Factor", $C_F$, wherein:

$C_F = (Rc \times \mu)/\sin \alpha$

The "Cone Torque" can be described by:

$C_T = C_F \times ©$, where © is the axial force on the cone.

Factors necessary to describe the characteristic of ramp surfaces 89, 92 include:

$\mu$=coefficient of friction between ramp surfaces 89, 92;

$\phi$=angle of ramp surfaces 89, 92 (perpendicular to axis of rotation); and

Rr=mean radius of ramp surfaces 89, 92.

In this case, the angle $\phi$ measured from a plane perpendicular to the axis of rotation and indicates the degree of rise in the ramp surfaces, for example an angle $\phi$ of zero degrees indicates flat surfaces at ramp portions 88 and 91 and as the angle $\phi$ increases the degrees of rise in the ramp surfaces becomes steeper. Also, the mean radius is a measure of the width of the ramp surfaces, indicated in FIGS. 6-7 by reference numeral 78, and is determined by the inner and outer radii of the ramp surfaces. These elements determine the "Ramp Factor", $R_F$, wherein:

$R_F = 1/(Rr (\tan (\phi + \arctan \mu)))$

The "Separation Force" can be described by:

$\S = Tr \times R_F$, where Tr is the torque on the cam ramp.

Also, the torque on ramp surface 92 equals the cone torque, thus, $Tr = C_T$. Finally, the axial force on cone clutch element 50 equals the separation force on ramp surface 92, thus, $\S = ©$. Combining and substituting the above equations results in the following relationships:

$C_T = C_F \times ©$ $C_T = C_F \times \S$ (since $\S =$)

$C_T = C_F \times Tr \times R_F$ (since $\S = Tr \times R_F$)

$Tr = C_F \times Tr \times R_F$ (since $Tr = C_T$)

$1 = C_F \times R_F$ (dividing both sides by Tr)

$C_F \times R_F > 1$ responds differently than $C_F \times R_F < 1$. This relationship determines whether the torque on ramp surface 92 will produce sufficient separation force to increase the cone torque. It has been determined that $C_F \times R_F > 1$ will satisfy the requirement stated above and provide the desired performance.

As such, when $C_F \times R_F > 1$ and a triggering force is applied, the present differential automatically reaches the fully engaged phase. When $C_F \times R_F < 1$, the frictional torque will depend on the triggering force applied, but when that triggering force is removed, the axial separation between the cone clutch element and the side gear will collapse due to the force provided by Belleville spring 49 and the differential will return to operating as an open differential. The product $C_F \times R_F$ may be set as desired by varying the variables discussed above.

Figure 9:
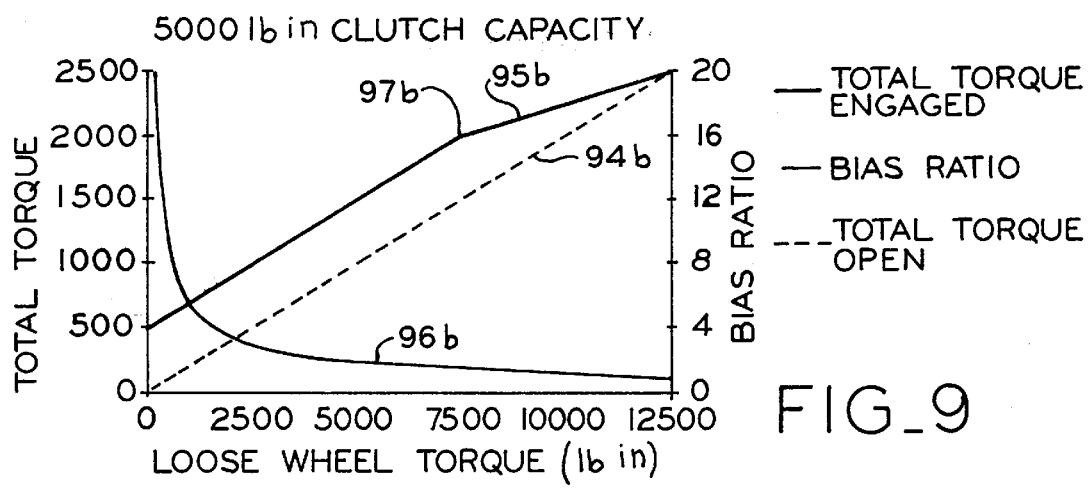
FIG. 9 is a chart illustrating the performance characteristics for a differential of the present invention with a 5000 lb. in clutch capacity.
Figure 10:
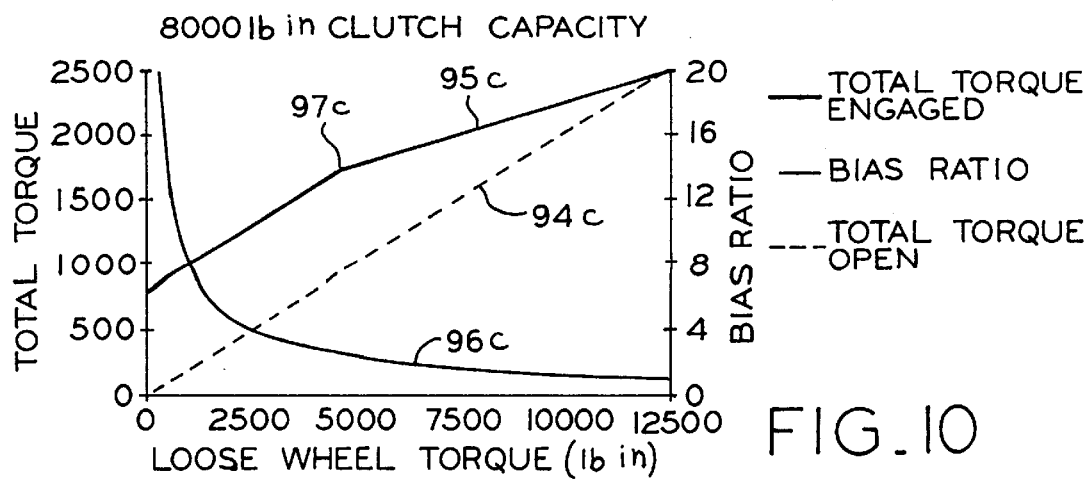
FIG. 10 is a chart illustrating the performance characteristics for a differential of the present invention with a 8000 lb. in clutch capacity.

FIGS. 8–10 illustrate the performance characteristics of the present limited slip differential for various clutch capacities, specifically 2500 lb.-in, 5000 lb.-in and 8000 lb.-in. As noted above, the clutch capacity is selected by varying the angle of frusto-conical engagement surfaces 43 and 55 (with respect to the axis of cone clutch element 50) and the characteristics of Belleville spring 48. Generally, as the angle of frusto-conical engagement surfaces 43 and 55 decreases, the clutch capacity increases. Also, as the stiffness of Belleville spring 48 increases, the clutch capacity increases.

Performance curves 94*a–c* show the amount of total torque applied as a function of the loose wheel torque applied in an open differential. As shown by performance curves 94*a–c*, an equal amount of torque is applied to both wheels. Performance curves 95*a–c* show the amount of total torque applied as a function of the loose wheel torque applied in the present limited slip differential when the clutch mechanism is engaged.

As shown by performance curves 95*a–c*, the present limited slip differential provides higher torque to the high traction wheel by an amount corresponding to the predetermined clutch capacity until respective knee portions 97*a–c* are reached. Knee portions 97*a–c* correspond to the points at which so much torque is applied to the differential that the high traction wheel also begins to lose traction. Thus, it can be seen that the slopes of performance curves 95*a–c* decrease and curves 95*a–c* approach curves 94*a–c* after respective knee portions 97*a–c*.

Curves 96*a–c* show the bias ratio for the present limited slip differential when the clutch mechanism is engaged. The bias ratio is defined as the ratio of the torque to the high traction wheel divided by the torque to the low traction wheel. A higher bias ratio means that the output shafts attached to the differential approach a locked axle, i.e., there is little or no relative rotation between the axles when relatively low total torque is applied to the wheels.

As shown by bias curves 96*a–c*, a high bias is advantageously provided in each case at relatively lower total torque. The bias ratio decreases to one as the total torque is increased indicating an even distribution of torque at high total torque.

The operation of the limited slip differential illustrated in FIGS. 1–7 and described above is now explained. Initially in the resting position, wherein the components of differential 10 have been interconnected and assembled as described above, differential 10 is connected to output shafts 21, 23, which are respectively coupled to stationary wheels that are in contact with a ground surface, no force is applied to differential 10 by the vehicle engine. In such a resting condition, Belleville spring 48 urges insert 40 away from casing section 12*a* and Belleville spring 49 urges cone clutch element 50 away from snap ring 39 so that frusto-conical engagement surface 55 is just out of contact with frusto-conical engagement surface 43 and cam portions 88 and 91 are fittingly engaged. An engine (not shown) provides torque to the wheels in the conventional manner, namely through a ring gear (ring gear), casing 12, pinion gears 28, 30, side gears 24, 26, splines 25, 27, and output shafts 21, 23, to the wheels (not shown).

In the case where both wheels have traction and the engine is able to develop torque, differential 10 operates as an open differential. The side gear separating forces are directly transmitted to casing 12 via end portion 35 of elongate portion 33 and thrust washer 37 into casing surface 38. Thus, the side gear separating forces have no effect on the operation of differential 10. Frusto-conical engagement surfaces 43 and 55 remain disengaged and side gears 24, 26 can rotate freely with respect to casing 12. FIG. 2 illustrates the present limited slip differential in the open differential state.

However, in situations where the vehicle is unable to generate torque, i.e., one wheel is on a surface having a low coefficient of friction, differentiation will occur and the limited slip feature is desired to prevent a "spin out". In such a case, the limited slip feature is actuated by the action of the fluid pump assembly whose output depends on the speed of differential rotation between output shafts 21, 23. When sufficiently high differentiation occurs, meshing rotation between the roots and teeth of pinion gears 28, 30 and side gears 24, 26 forces sufficient fluid into cavity 59 to rapidly buildup the fluid pressure in cavity 59. At high differential rotation rates, the volume of fluid forced into cavity 59 is greater than the volume released through bleed-off passages 69.

The fluid pressure in cavity 59 is exerted against all sides of cavity 59 and forces cone clutch element 50 to move axially, away from cam portion 88, recessed portion 51 and flange 58 of side gear 24. The fluid pressure in cavity 59 is maintained by surrounding seal 61 and 61*a*. The initial axial movement of cone clutch element 50 frictionally engages frusto-conical engagement surfaces 43 and 55. The initial engagement of frusto-conical engagement surfaces 43 and 55 transfers an initial amount to clutch torque between casing 12 and side gear 24. The transition phase in which cone clutch element 50 initially moves to the left is illustrated in FIG. 3.

As frusto-conical engagement surfaces 43 and 55 frictionally engage, cone clutch element 50 momentarily slows down with respect to side gear 24 so that cone clutch element 50 lags side gear 24. The resulting relative movement between cone clutch element 50 and side gear 24 causes ramp surfaces 89 and 92 to, begin to ride up on each other. The ride up between ramp surfaces 89 and 92 produces further axial movement forces between cone clutch element 50 and side gear 24 causing cone clutch element 50 to move further axially and fully engage frusto-conical engagement surfaces 43 and 55.

The axial movement forces and relatively tight engagement of frusto-conical engagement surfaces 43 and 55 causes insert 40 to move axially with cone clutch element 50 toward casing section 12*a*. As insert 40 moves toward casing section 12*a*, ramp surfaces 89 and 92 continue to ride up on each other until maximum axial separation between cone clutch element 50 and side gear 24 is reached. The movement limit of cone clutch element 50 and insert 40 is reached when Belleville spring 49 is fully collapsed. FIG. 4 illustrates the present limited slip differential wherein the clutch mechanism is fully engaged.

It is to be noted that once the initial axial movement of cone clutch element 50 is triggered and frusto-conical engagement surfaces 43 and 55 frictionally engage to transfer clutch torque, the differential rotation between the output shafts will slow sufficiently so that fluid pressure in cavity 59 is relieved by fluid flow through bleed off passages 69. However, once the initial axial movement of cone clutch element 50 has been triggered, the initial clutch torque transfer and the interaction of the cam portions provide the necessary separation force to ensure that frusto-conical engagement surfaces 43 and 55 fully engage and cone clutch element 50 and insert 40 reach their movement limit. As noted above, the design characteristics of Belleville spring 48 and the angle of frusto-conical engagement surfaces 43 and 55 determines the amount of clutch torque transferred each time the clutch mechanism is actuated by the fluid pump assembly.

While this invention has been described as having an exemplary design, the present invention may be further modified within the spirit and scope of this disclosure. For example, the recess portion, piston and cavity on the side gear may comprise either an annular recess portion, annular piston and annular cavity as well as a plurality of recess portions, pistons and cavities. As described above, the ratio of supply passages to root surfaces on the side gear may be adjusted as desired. Also, although only side gear 24 is shown to have an associated cavity 59, fluid pump assembly, cone clutch element 50, and insert 40 in FIGS. 1–4, it is to be understood that a similar cavity, fluid pump assembly, clutch element, and insert may be included with side gear 26, which would operate in the same fashion.

Therefore, this application is therefore intended to cover any variations, uses, or adaptations of the invention using its general principles. Further, this application is intended to cover such departures from the present disclosure as come within known or customary practice in the art to which this invention pertains.

What is claimed is:

1. A limited slip differential, comprising:
   a rotatable casing;
   a pinion gear rotatably supported in said casing;
   a side gear rotatably supported in said casing and coupled to an output element, said side gear meshingly engaged with said pinion gear;
   a clutch disposed between said side gear and said rotatable casing, said clutch and said side gear defining an annular cavity which encircles the axis of said side gear, said clutch actuated by the build-up of fluid pressure in said cavity; and
   a fluid pressure source in fluid communication with said cavity, said fluid pressure source transferring fluid into said cavity to generate fluid pressure in said cavity in response to relative rotation between said side gear and said pinion gear.

2. A limited slip differential, comprising:
   a rotatable casing;
   a pinion gear rotatably supported in said casing;
   a side gear rotatable supported in said casing and coupled to an output element, said side gear meshingly engaged with said pinion gear;
   a clutch disposed between said side gear and said rotatable casing, said clutch and said side gear defining an annular cavity which encircles the axis of said side gear, said clutch actuated by the build-up of fluid pressure in said cavity; and
   a fluid pressure source in fluid communication with said cavity, said fluid pressure source transferring fluid into said cavity to generate fluid pressure in said cavity in response to relative rotation between said side gear and said pinion gear, wherein said side gear includes a first cam portion having ramp surfaces, said clutch includes a second cam portion having ramp surfaces operatively engaging said first cam portion, said first and second cam portion ramp surfaces riding up on each other to generate axial movement between said clutch and said side gear in response to clutch torque generated by the build-up of fluid pressure in said cavity.

3. The limited slip differential according to claim 2, wherein said first cam portion ramp surfaces are disposed around the axis of said side gear, and said second cam portion ramp surfaces are disposed around the axis of said clutch.

4. The limited slip differential according to claim 2, wherein said clutch comprises a clutch element disposed around said side gear and an insert disposed between said clutch element and said rotatable casing, said clutch element and said insert operatively engaging each other to resist relative rotation between said side gear and said rotatable casing in response to first, the build-up of fluid pressure in said cavity and second, the separation force resulting from said side gear ramp surface slidably engaging said clutch ramp surface.

5. The limited slip differential according to claim 4, wherein said clutch element comprises a cone clutch element having a first frusto-conical engagement surface and said insert comprises a second frusto-conical engagement surface, said first and second frusto-conical engagement surfaces operatively engaging each other to resist relative rotation between said side gear and said rotatable casing in response to the build-up of fluid pressure in said cavity and the separation force resulting from said side gear ramp surface slidably engaging said clutch ramp surface.

6. The limited slip differential according to claim 5, further comprising a first biasing element disposed between said side gear and said clutch element, said first biasing element urging said first and second cam portions into engagement.

7. The limited slip differential according to claim 6, further comprising a second biasing element disposed between said insert and said rotatable casing, said second biasing element resisting the axial movement of said insert.

8. The limited slip differential according to claim 7, wherein the angle of said frusto-conical engagement surfaces and said second biasing element provide a predetermined amount of resistance to relative rotation between said side gear and said rotatable casing.

9. A limited slip differential, comprising:
   a rotatable casing;
   a pinion gear rotatably supported in said casing;
   a side gear rotatably supported in said casing and coupled to an output element, said side gear meshingly engaged with said pinion gear;
   a clutch disposed between said side gear and said rotatable casing, said clutch and said side gear defining an annular cavity which encircles the axis of said side gear, said clutch actuated by the build-up of fluid pressure in said cavity; and
   a fluid pressure source in fluid communication with said cavity, said fluid pressure source transferring fluid into said cavity to generate fluid pressure in said cavity in response to relative rotation between said side gear and said pinion gear, wherein said fluid pressure source comprises a supply passage disposed in said side gear, said supply passage having an inlet disposed on a surface of said side gear and an outlet in fluid communication with said cavity, whereby the rotational interaction of said side gear and said pinion gear forces fluid into said supply passage inlet.

10. The limited slip differential according to claim 9, wherein said supply passage comprises a plurality of supply passages and disposed radially about an axis of said side gear, each said supply passage having an inlet disposed on a root surface of said gear in an outlet in fluid communication with said cavity.

11. The limited slip differential according to claim 10, further comprising a check valve disposed in cavity adjacent said supply passage outlet whereby said check valve only permits one-way flow through said supply passage.

12. The limited slip differential according to claim 11, wherein said clutch element comprises a bleed off passage having an inlet in fluid communication with said cavity and an outlet disposed on a surface of said cone clutch element.

13. A limited slip differential, comprising:
   a rotatable casing;
   a pinion gear rotatably supported in said casing;
   a side gear rotatably supported in said casing and coupled to an output element, said side gear meshingly engaged with said pinion gear, said side gear having a recessed portion;

an insert having a frusto-conical engagement surface disposed in said rotatable casing, said insert secured to prevent rotation of said insert with respect to said rotatable casing, said insert adapted to move axially with respect to said rotatable casing, a clutch element having a frusto-conical engagement surface disposed between said side gear and said insert, said clutch element and said recessed portion forming a cavity, said frusto-conical engagement surfaces operatively engaging each other in response to the build-up of fluid pressure above a predetermined pressure threshold in said cavity, wherein said clutch element and said insert move axially by a predetermined amount to transfer a predetermined amount of clutch torque between said side gear and said rotatable casing; and a fluid pressure source in fluid communication with said cavity, said fluid pressure source transferring fluid into said cavity to generate fluid pressure in said cavity in response to meshing rotation between said side gear and said pinion gear.

14. The limited slip differential according to claim 13, wherein said side gear includes a first cam portion having ramp surfaces, said clutch element includes a second cam portion having ramp surfaces operatively engaged with said first cam portion ramp surfaces, said ramp surfaces riding up on each other to cause axial movement between said side gear and said clutch element in response to the clutch torque generated by the build-up of fluid pressure in said cavity.

15. The limited slip differential according to claim 14, further comprising a first biasing member disposed between said side gear and said clutch element, said biasing member urging fitting engagement of said first and second cam portions.

16. The limited slip differential according to claim 15, further comprising a second biasing member disposed between said insert and said rotatable casing, said second biasing member resisting the axial movement of said insert.

17. The limited slip differential according to claim 16, wherein said fluid pressure source comprises a supply passage disposed in said side gear, said supply passage having an inlet disposed on a surface of said side gear and an outlet in fluid communication with said cavity, whereby the rotational interaction of said side gear and said pinion gear forces fluid into said supply passage inlet.

18. The limited slip differential according to claim 17, wherein said supply passage comprises a plurality of supply passages and disposed radially about an axis of said side gear, each said supply passage having an inlet disposed on a root surface of said gear in an outlet in fluid communication with said cavity.

19. The limited slip differential according to claim 18, further comprising a check valve disposed in cavity adjacent said supply passage outlet whereby said check valve only permits one-way flow through said supply passage.

20. The limited slip differential according to claim 19, wherein said clutch element comprises a bleed off passage having an inlet in fluid communication with said cavity and an outlet disposed on a surface of said clutch.

* * * * *

UNITED STATES PATENT AND TRADEMARK OFFICE
CERTIFICATE OF CORRECTION

PATENT NO    : 5,951,426
DATED        : September 14, 1999
INVENTOR(S)  : James L. Forrest It is certified that error appears in the above-identified patent and that said Letters Patent is hereby corrected as shown below:

In the Claims

Claim 2, Column 11, Line 33

Change "rotatable" to --rotatably--

Signed and Sealed this

Eleventh Day of April, 2000

Attest:

Attesting Officer

Q. TODD DICKINSON
Director of Patents and Trademarks